No. 617,708. Patented Jan. 17, 1899.
R. W. BARKLEY.
CONDUIT ELECTRIC RAILWAY.
(Application filed June 13, 1892. Renewed Jan. 22, 1895.)
(No Model.) 2 Sheets—Sheet 2.
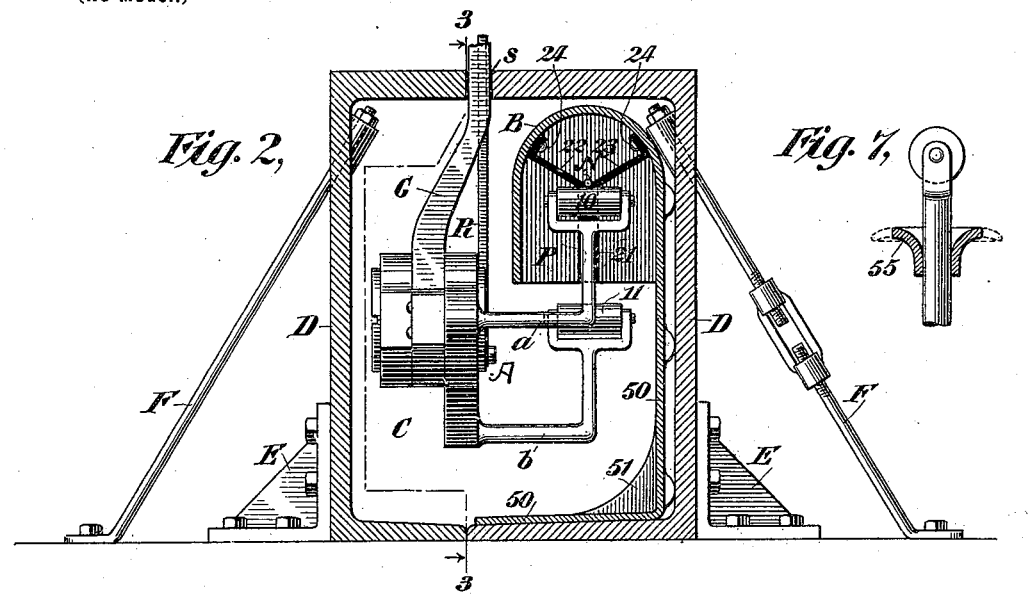
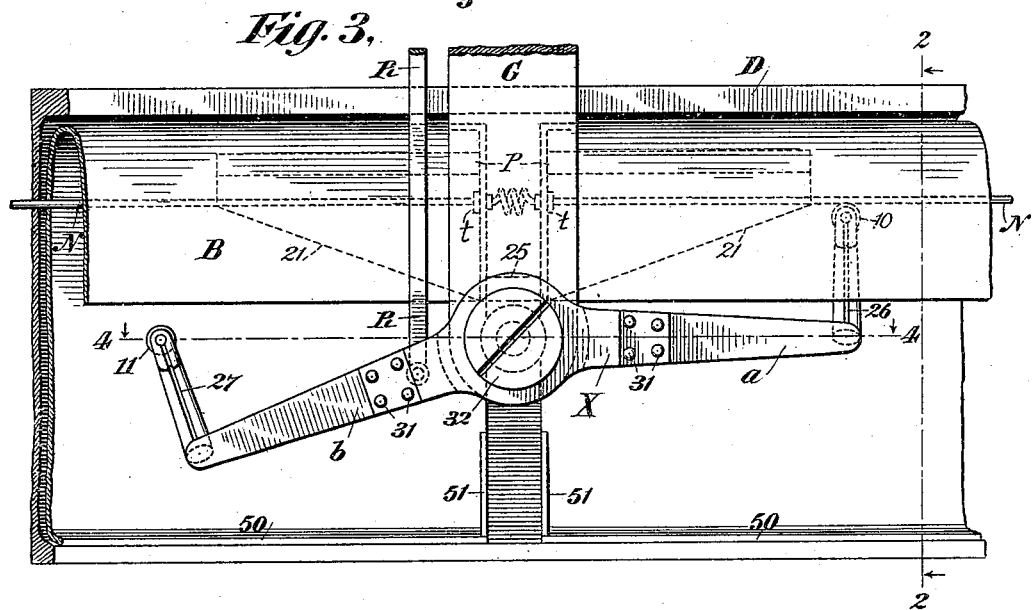
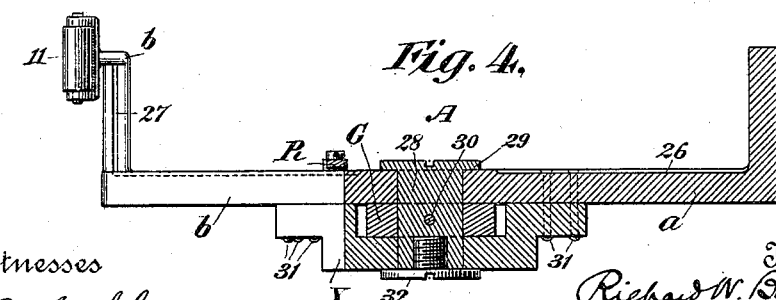
Witnesses
C. E. Ashley
H. W. Lloyd
Inventor
Richard W. Barkley

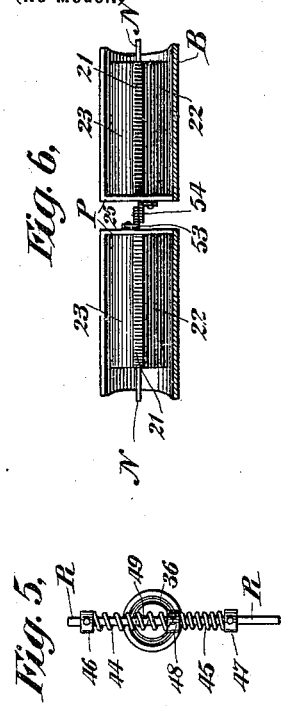

UNITED STATES PATENT OFFICE.

RICHARD W. BARKLEY, OF NEW YORK, N. Y.

CONDUIT ELECTRIC RAILWAY.

SPECIFICATION forming part of Letters Patent No. 617,708, dated January 17, 1899.

Application filed June 13, 1892. Renewed January 22, 1895. Serial No. 535,823. (No model.)

*To all whom it may concern:*

Be it known that I, RICHARD W. BARKLEY, a citizen of the United States, and a resident of the city, county, and State of New York, have invented certain new and useful Improvements in Air-Chamber Conduits for Electric Railways, of which the following is a specification.

This invention relates to electric railways wherein the vehicles are driven by electric power derived from conductors extending along the line of the road, the conductors receiving the current from suitable stationary sources, as dynamo-electric machines.

In some of its phases it is an improvement upon the invention shown in my Letters Patent dated June 14, 1892, and numbered 476,776.

In other phases the present invention is applicable in cases where the air-chamber or diving-bell protectors of the wire are not used.

I will not here attempt a general statement of the invention, but reserve the same for the claims.

One form of my present invention is shown in the accompanying drawings, forming part of this specification, in which—

Figure 1 is a sectional side elevation of part of a car, air-chamber conduit, and double trolley. Fig. 2 is a cross-section of a conduit and the air-chambers opening thereinto and also showing the double trolley in end elevation on line 2 2, Fig. 3. Fig. 3 is an enlarged view of part of the devices shown in Fig. 1, the view being taken on line 3 3 of Fig. 2. Fig. 4 is a sectional plan view of the trolley, taken on line 4 4 of Fig. 3; and Figs. 5 and 6 are detail views of modifications.

The reference B marks the air-chambers, which are or may be made of any suitable material and are secured in place in a suitable manner, as set forth in my aforesaid patent. A main electric conductor N leads through the air-chambers, near the tops thereof, passing through the end walls P in an air-tight manner. This conductor conveys the current from the source of electric energy or receives it from a supply-conductor. The conductor N passes through thimbles $t$ in the walls P, which secure an air-tight joint thereat. The thimbles are or may be of insulating material. In case the end walls P of two air-chambers are separated by a space the conductor N may be formed with a turn or so to allow for expansion or contraction of the air-chambers if the latter are of material expansible by heat. The wire N is insulated where it lies between the air-chambers.

The air-chambers open downwardly into a conduit, as C, formed in a suitable way, the conduit having a longitudinal slot $s$. The conduit shown is formed by two channel-bars D, the air-chambers being placed therein under the flange of one of them. These bars D rest on the cross-ties T, being secured thereto by suitable means, as angles E and rods F. The latter may have turnbuckles in them, if desired, to adjust the positions of the bars D. The adjacent edges of the upper flanges of the bars D form the sides of the slot $s$.

Reference K marks the framing of the truck, and W two wheels thereof.

The double trolley is carried by a suitable support, which may be secured to the car or to the truck, preferably the latter. In the drawings the support G is borne by the bar L, secured to the beams of the truck K. While the support G may be held to the truck in the manner set forth in my aforesaid patent, I prefer to have it forked and to have each leg of the fork pass loosely through holes in the bar L and to rest the same on springs, as M. Pins in or collars on the forks below the bar L limit the upward motion of the support G. A double trolley for trailing in either direction, as A, is suitably pivoted to the support G, preferably at the center of the trolley. The arms $a$ $b$ of the trolley A are fitted with suitable contact-pieces, as rollers 10 11, respectively, for coaction with the conductor N. Perhaps it should be stated here that the conductor N may be and preferably is supported by suitable hangers between the ends of each air-chamber. An insulated conductor $c$ leads from the roller 10 along the trolley A and the support G to a suitable switch on the car or on the truck. A similar conductor leads from roller 11 to the said switch in like manner. Such a switch is shown at S on a bracket Q, secured to the bar L, above described. The conductor $c$ is secured to one contact, as 12, thereof, and conductor $d$ is secured to a contact, as 13, thereof, the said contacts being insulated from each other. A movable contact is provided which may be moved from one to the other of contacts 12 13. I show a contact or switch 14 borne by and insulated from the lever O, which itself is pivoted to the bracket Q. From the contact 14 a conductor 16 is shown leading to the motor; but it is understood that in practice this conductor would go to the usual rheostat and reversing-switch before being led to the motor. References 17, 18, and 19 mark brushes, and 20 a commutator of a motor of usual or old form.

The lever O or the movable contact referred to above may be moved by suitable means to connect whichever of rollers 10 11 may be in contact with the conductor N with the motor. I prefer to have said movable contact on a lever, as O, and to connect the latter with the trolley A, so that the movements of the latter will govern those of the former. With this purpose in view I connect the lever O and trolley by a rod R, pivotally attached to each. When either trolley-wheel is moved down by an incline 21, the electrical connection thereto is broken by the switch, and the electrical connection to the other trolley-wheel is made at or about the same time.

The trolley A is rocked on its pivot to bring either of rollers 10 11 into contact with the main conductor N by suitable means under the control of the operator or motorman on the vehicle. One form of such means is shown in the drawings herewith. Said means consist of the rod R; a collar 33, capable of sliding on said rod; a spring 34, coiled around the rod; a collar 35, fast on the rod, said spring being secured to each of said collars; a cam 36, engaging and controlling the collar 33, said cam having a journaled shaft 49 and a drum on said shaft; a wrapping connector 37 encircling said drum one or more times and having its ends fast to drums or spools 38 39 on shaft 40, and a hand-wheel 41 on said shaft 40 at a point convenient to the motorman. The drums 38 39 may be fast on the shaft 40, but a better construction is to have them loose thereon and to hold them rigidly thereto by a jam-nut, as 42, as this permits of taking up any slack in the connector 37 that may arise. Pins passing through holes in the drums 38 39 may be used to prevent turning of the drums relatively to each other, if desired. The ends of the connector 37 wind in opposite ways on these drums, so that one winds on as the other winds off. A roller 43 guides the connector 37 over the framing of truck K. By turning the shaft 40 the cam 36 is rotated and the trolley A rocked on its pivot. The spring 34 is so adjusted that when the cam is in the position shown in Fig. 1 it is under compression and when the cam is turned half-way around the spring is distended. In the first case the roller 10 is raised, in the second the roller 11.

To cause the trolley to dive under the walls or septums separating the air-chambers, I provide suitable inclines or cams near the ends of the chambers, with which the trolley coacts. These inclines may be curved or straight and are by preference of or covered with insulating material when placed within the air-chamber under the main conductor, in which positions they coact with the rollers 10 11. It is to be understood that these inclines may be placed elsewhere and coact with the trolley A or extensions thereof for the same purpose. When the inclines, as 21, are placed beneath the main conductor, I prefer to have them integral with the wings (two or more) 22 23, by which they may be braced against the top or sides of the air-chambers. These wings should be secured to the ends of the air-chambers in an air-tight manner, for a purpose presently to appear. They are secured to the tops or sides of the chambers, if desired. I show flanges and rivets or screws 24 for this purpose. The wings are of oblong form and the conductor N passes above them, so that any water that may be dashed upwardly at the ends of the air-chambers by passing trolleys is prevented from reaching the wire by them. In case the end walls P of the air-chambers do not touch the space between them may be bridged over in the vertical plane of the main conductor by suitable means, as a bridge 25, consisting of two angles 53 54, secured to different end walls P and lying alongside each other. This construction also allows for the effects of heat and cold in cases where the air-chambers are made of metal or other material affected thereby. The bridge prevents the trolley from rising between the air-chambers.

In the instance shown the car is assumed to be moving to the left, and the operation of the parts is as follows: The roller 10 runs along the wire N until it reaches the upper part of incline 21, (which may be here curved to give easy entrance to the roller,) when it runs down the same, losing contact with the wire N, across bridge 25, if used, and then up the other incline 21 to and in contact with the wire N in the adjacent air-chamber. As roller 10 descends roller 11 rises, and vice versa.

The conductors c d may lead in any suitable way to the switch S inside or outside the trolley and support. The switch may be dispensed with altogether and the conductor 16 be led down the support G to the pivot of the trolley, as in my aforesaid application, and the conductors c d end at the pivot aforesaid in such wise that one or the other, but not both, may be in contact with conductor 16, according to which roller is in contact with the wire N. I have not deemed it necessary to show this arrangement or switch, since its construction will be understood readily from the construction shown and described in said prior patent. In Figs. 3 and 4 are shown grooves 26 27 in arms a b, respectively, for the conductors c d. Support G may have grooves for the same purpose. Arms a b are each shown with two bends in them to bring the rollers 10 11 under the chambers and into contact with the conductor N. Those parts of the arms *a b* which pass under and into the chambers are preferably flattened, so as to decrease the resistance of water to the passage of the same therethrough. In case the trolley is wholly under the air-chambers, as in my prior patent above referred to, there need be but one bend in each arm of the trolley.

One method of pivoting the trolley A to the support is shown in Fig. 4. A spindle 28, having a shoulder or flange 29, is put through a hole in the trolley A. It is then put through a hole in the support G. The bent bar X is then placed over the spindle, it having a hole for that purpose, and is secured in place by the screw 32, which has a shoulder overlapping the bar and which enters and engages a screw-threaded hole in the spindle 28. The bar X is secured to the trolley A by bolts or rivets 31. A pin or screw 30, passing through the support G into the spindle 28, may be used to hold the latter against turning. This construction gives a long bearing to the trolley. The bar X may be dispensed with, if desired. This permits of a narrower conduit C.

For the purpose of controlling the rod R by a yielding connection with the cam 36 I prefer the construction shown in Fig. 5, where there are two collars or shoulders 46 47 fast on rod R, at some distance apart. Between them is a collar 48, free to slide on the rod. A helical spring 44 abuts against collars 46 48, and a similar spring 45 abuts against the collars 47 48, both springs surrounding the rod R. One or the other of said springs is always under greater compression than the other, according to the roller in contact with the wire N. The cam 36 engages the loose collar 48 and rocks the trolley, as in the case shown in Fig. 1 and described above.

The wrapping connector 37 may be a sprocket-chain on sprocket-wheels on shafts 40 49. In such case the wheel 41 may be turned in one direction only to rock the trolley A.

The rear walls of the air-chambers may be extended downward to and wholly or partly across the bottom of the conduit, as at 50, and be secured thereto by suitable means. Flanges 51, placed at suitable intervals, may be used to give stiffness to the walls 50. The open spaces 52 between the air-chambers provide means for the escape of water from behind the walls 50.

I do not limit myself to the precise form of the invention shown in the drawings and described above, as I am aware that the same may be varied within wide limits without departing from my invention.

The inclines 21 may be formed by the ends of the air-chambers themselves; also, the tops of the air-chambers at the ends may be bent down to form the inclines and wings. I mention these as examples only of modifications of my invention shown and claimed herein.

Again, the trolley may have a rectilinear up-and-down movement relatively to the support G for the purpose of passing the end walls of the air-chambers.

For more minute information concerning the material for and the construction of the air-chambers, trolley, location of the conduit relatively to the rails on which the wheels W run, &c., I refer to my aforesaid patent. It may be here stated that the rollers 10 11 are suitably insulated from the arms that carry them, as usual in such constructions. The conductors *c d* are secured in the grooves 26 27 by suitable means.

At such times as the conduit C is partly or wholly filled with water there will be a water column rising along the front of the trolley in contact with the conductor, and the greater the speed the higher will this column rise. It may even rise to the conductor N, and thus cause a short circuit of the current. I provide a stop or deflector on the trolley under each contact-piece to stop or deflect this column. The stop or deflector may be in the form of a ring, collar, or shoulder on or around the trolley. I show a deflector 55 bending away from the trolley as it rises thereon below the contact-piece. The deflector may end, as shown in full lines, or it may bend over, as shown in dotted lines. I prefer that the deflector 55 shown shall be of flexible material, as soft rubber or leather, so that it may yield in case it comes in contact with the inclines or other parts.

Having thus fully described my invention, what I claim, and desire to secure by Letters Patent, is—

1. In an electric railway, the combination of a main conductor, a double trolley provided with two contact-pieces, independent conductors from said pieces, and means for causing either of said pieces to make contact with said main conductor, substantially as described.

2. In an electric railway, the combination of a trolley provided with a contact-piece, a rod connected to said trolley, two fixed collars on said rod, a loose collar on said rod intermediate said fixed collars, springs between said fixed and loose collars, and means for moving said loose collar against the force of either of said springs to operate said trolley, substantially as described.

3. In an electric railway, the combination of a double trolley provided with independent contact-pieces at the ends thereof, a rod connected to said trolley, two fixed collars on said rod, a loose collar on said rod intermediate said fixed collars, springs between said loose and fixed collars, and means for moving said loose collar against the force of either of said springs to bring either of said contact-pieces into contact with a conductor or trolley-wire, substantially as described.

4. In an electric railway, the combination of an air-chamber open at its bottom, a trolley-wire or main conductor therein near the top thereof, a trolley provided with a contact-piece, and hand-operated means for moving said trolley into and out of said chamber, substantially as described.

5. In an electric railway, the combination of a series of air-chambers open at their bottoms, an electric conductor or trolley-wire in said chambers near the tops thereof, a pivoted trolley provided with a contact-piece, and inclines fixed in the road-bed for moving said trolley down out of said air-chambers, substantially as described.

6. In an electric railway, the combination of a series of air-chambers, open at their bottoms, a main conductor in said chambers near the tops thereof, a support depending from a car or truck, a double trolley pivoted on said support and provided with two contact-pieces, and means for rocking said trolley to bring either piece in contact with said main conductor, substantially as described.

7. In an electric railway, the combination of a series of open-bottomed air-chambers, a main conductor therein near the tops thereof, a support, a double trolley pivoted to said support and provided with two contact-pieces, means for rocking said trolley to bring either piece into contact with the main conductor, and means in the road-bed for moving said contacting piece out of said chambers to pass from one to another thereof, substantially as described.

8. In an electric railway, the combination of a series of open-bottomed air-chambers, a main conductor therein near the tops thereof, a support, a double trolley pivoted to said support and provided with two contact-pieces, hand-operated means for rocking said trolley to bring either piece into contact with said conductor, and insulated inclines for moving the contacting piece and trolley out of the air-chambers to pass from one to another thereof, substantially as described.

9. In an electric railway, the combination of an air-chamber open at its bottom, a trolley-wire therein near the top thereof, an insulated incline leading downwardly at one or both ends of the chamber, a trolley provided with a contact-piece, and spring-operated means for pressing said piece against said wire or conductor, substantially as described.

10. In an electric railway, the combination of an open-bottomed air-chamber, a main conductor or trolley-wire therein near the top thereof, an insulated incline and wings under the conductor at one or both ends of the chamber, and a spring-operated trolley provided with a contact-piece, substantially as described.

11. In an electric railway, the combination of a support, a double trolley pivoted thereon and provided with two contact-pieces, means for rocking said trolley to bring either of said pieces into contact with a main conductor, and means for connecting the contacting piece electrically with a motor and disconnecting the other piece therefrom, substantially as described.

12. In an electric railway, the combination of a support, a double trolley pivoted thereon provided with two contact-pieces, an independent conductor from each piece, a switch, a conductor therefrom to a motor, and means for rocking said trolley to bring either of said pieces into coaction with a main conductor and operating said switch, substantially as described.

13. In an electric railway, the combination of a support, a double trolley thereon provided with two contact-pieces, independent conductors from said pieces, a switch to which they lead, and means for rocking the trolley to bring either of said pieces into contact with a main conductor, and for operating said switch, substantially as described.

14. In an electric railway, the combination of a series of air-chambers open at their bottoms, a main conductor in said chambers near the tops thereof, a support carried by a car, a double trolley pivoted on said support and provided with two contact-pieces, independent conductors from said pieces, a switch to which said conductors lead, a mechanical connection between said trolley and said switch, and means for rocking said trolley on its pivot to bring either piece into contact with said conductor, substantially as described.

15. In an electric railway, the combination of a main conductor, a switch provided with a movable and two fixed elements the movable element being connected electrically with a motor, a double pivoted trolley provided with two contact-pieces, conductors for connecting the trolley contact-pieces with said fixed elements in pairs, and means for moving both the trolley and the said movable element, substantially as described.

16. In an electric railway, the combination of a main conductor, a switch provided with a movable and two fixed elements the movable element being connected with the motor, a double trolley provided with two contact points or pieces, independent conductors connecting said pieces and fixed elements in pairs, a rod connecting the trolley and the movable element of the switch, and means for moving said parts, substantially as described.

17. In an electric railway, the method of preventing leakage in conveying an electric current from a conductor protected by air-chambers from water while the street or road is submerged to a motor on a car, which consists in making contact between the trolley and conductor in said air-chambers, and in causing the trolley to dive under the walls or partitions between the air-chambers losing and taking up contact with the conductor, substantially as described.

18. In electric railways provided with trolley-wires or conductors protected from contact with water by a series of air-chambers open at their bottoms, a trolley provided with a contact-piece and with a stop or deflector thereon under the contact-piece to stop or deflect any water rising along said trolley, substantially as described.

19. In an electric railway, the combination with an air-chamber open on the bottom, a trolley-wire or electric conductor therein near the top thereof, a trolley pivoted on or in an arm extending downwardly from a car, a conductor carried by said trolley, and a switch carried by said car above the surface of the ground with which the last-named conductor is connected, with connections between said trolley and said switch for operating the same, and means for moving said trolley into and out of the air-chamber, substantially as described.

20. The combination, in an electric railway, of an air-chamber, an electric conductor in said chamber near the top thereof, a trolley, a switch carried above the surface of the ground by a car, and connections between the trolley and the switch whereby the trolley operates the switch, substantially as described.

21. In an electric railway, the combination of an air-chamber open at its bottom, a trolley-wire or electric conductor therein near the top thereof, a pivoted trolley provided with a contact-piece, and an insulated incline under the trolley-wire leading downwardly for moving the said trolley, the said trolley being bowed or bent downwardly away from the trolley-wire between its pivot and said contact-piece, whereby it may be moved downwardly without striking, substantially as described.

22. In an electric railway, the combination of a series of open-bottomed air-chambers, a trolley-wire or electric conductor therein near the tops thereof, a trolley consisting of a horizontal part extending transversely of the track beneath the edge of the air-chamber an upwardly-extending arm provided with a contact-piece and lying in substantially the vertical plane through the trolley-wire and at the other end of the horizontal part an arm extending in a plane substantially parallel to the first-named plane and pivoted, and means for moving said trolley down and up in passing from one to another of said chambers, substantially as described.

23. In an electric railway, the combination of a series of air-chambers open at their bottoms, the electric conductor therein near the tops thereof, a trolley, and insulated inclines at the ends of the chambers for moving said trolley down out of said chambers, with a spring for returning said trolley, substantially as described.

24. In an electric railway, the combination of a series of air-chambers open at their bottoms and separated by spaces from each other, the electric conductor therein near the tops thereof, a trolley, and insulated inclines for moving said trolley down out of said chambers, with a spring for returning said trolley, and bridges between said chambers for said trolley, substantially as described.

25. The combination of a series of underground air-chambers extending along a railway, an electric conductor therein near the tops thereof, and reverse inclines leading downwardly from said conductor at the ends of said air-chambers, substantially as described.

26. The combination of a series of oblong underground air-chambers open at their bottoms and extending along an electric railway with their ends adjacent each other, an electric conductor in said chambers near the tops thereof, reverse inclines leading downwardly from the said conductor at the ends of said chambers, and bridges across the spaces between the said ends in line with said inclines, substantially as described.

27. In an electric railway, the combination of an underground slotted conduit, a series of air-chambers open at their bottoms and extending along one side of the slotted conduit, inclines at the adjacent ends of air-chambers converging downwardly said inclines being under the conductor, an electric conductor extending along said chambers near the tops thereof, a bridge between two of said air-chambers in line with said inclines, a motor-car, an electric motor thereon, and a contact-carrier or trolley electrically connected with said motor and adapted to move along the conductor, the inclines and said bridge, substantially as described.

In testimony that I claim the foregoing as my invention I have signed my name, in presence of two witnesses, this 10th day of June, 1892.

RICHARD W. BARKLEY.

Witnesses:
   GUS. C. HENNING,
   F. GOODWIN.